United States Patent [19]

Gutmann

[11] Patent Number: 5,027,924
[45] Date of Patent: Jul. 2, 1991

[54] CASHIER CHECK-OUT STATION WITH PACKAGE-CATCHING SHOPPING CART

[75] Inventor: Karl Gutmann, Unterkirnach, Fed. Rep. of Germany

[73] Assignee: Firma Karl Gutmann KG, Unterkirnach, Fed. Rep. of Germany

[21] Appl. No.: 408,136

[22] Filed: Sep. 15, 1989

[30] Foreign Application Priority Data

Sep. 15, 1988 [DE] Fed. Rep. of Germany ... 8811718[U]
Nov. 11, 1988 [DE] Fed. Rep. of Germany ... 8814136[U]
Feb. 16, 1989 [DE] Fed. Rep. of Germany ... 8901795[U]

[51] Int. Cl.$^5$ .............................. A47F 9/04; B62B 3/00
[52] U.S. Cl. .................................... 186/62; 280/33.995
[58] Field of Search ........................ 186/60, 62, 63, 64, 186/65, 68; 280/33.991, 33.992, 33.995, 33.997, DIG. 4; 194/905

[56] References Cited

U.S. PATENT DOCUMENTS

| 3,286,794 | 11/1966 | Shoffner | 186/65 |
| 3,437,176 | 4/1969 | Ruttenberg et al. | 280/33.995 X |
| 4,679,805 | 7/1987 | Cunningham | 280/33.991 |

FOREIGN PATENT DOCUMENTS

1196954  7/1965  Fed. Rep. of Germany ........................ 280/33.995

Primary Examiner—F. J. Bartuska
Attorney, Agent, or Firm—McGlew & Tuttle

[57] ABSTRACT

A cashier check-out station includes a counter having a platform or conveyor belt leading to a register station, the counter defining a lane along a longitudinal side of the counter. The station arrangement includes a shopping cart with a basket having a substantially isosceles trapezoidal shape viewed from above. The cart includes a chassis frame, a front pair of castors attached to the chassis frame and a rear set of castors attached to the chassis frame. The front pair of castors defines a track width which is smaller than the track width defined by the rear set of castors. The shopping basket is adapted to travel through the lane defined along the longitudinal side of the counter to an unloading end of the counter. The shopping basket includes a chute-like bottom portion inclined at an angle of at least 15 degrees from the horizontal. The bottom portion includes an upper transverse edge. A tracking arrangement is provided positioned adjacent the upper transverse edge. A track is disposed transversely in a substantially horizontal position on the unloading end of the counter, the tracking arrangement engages the track for positioning the upper transverse edge of the basket adjacent the unloading end of the counter.

20 Claims, 2 Drawing Sheets

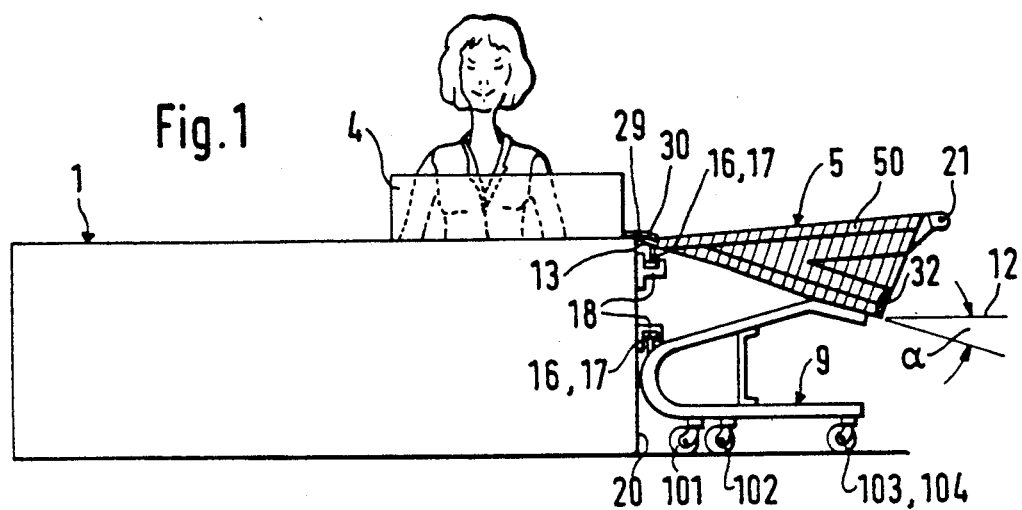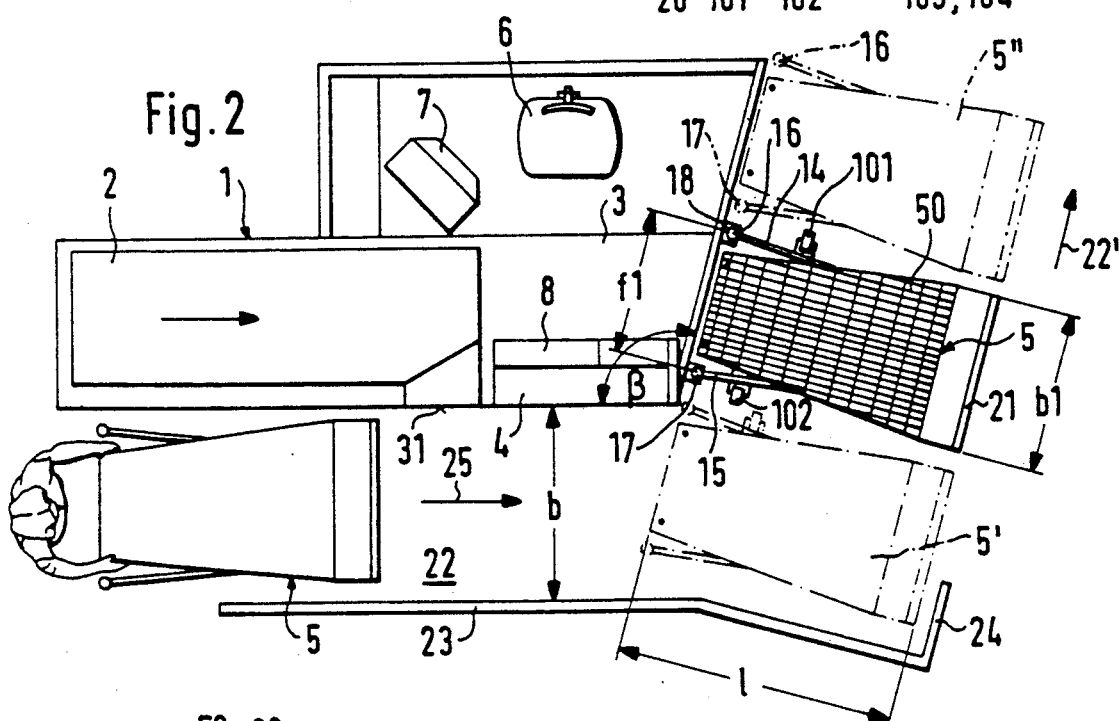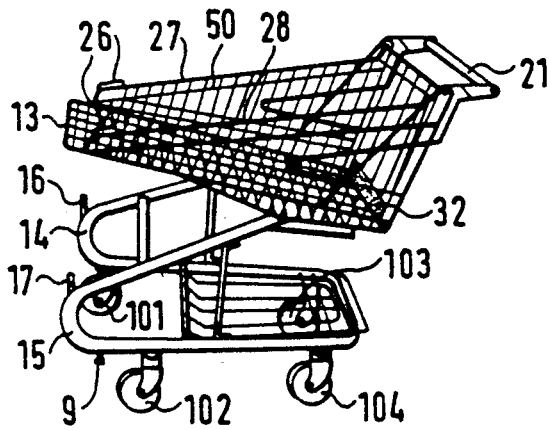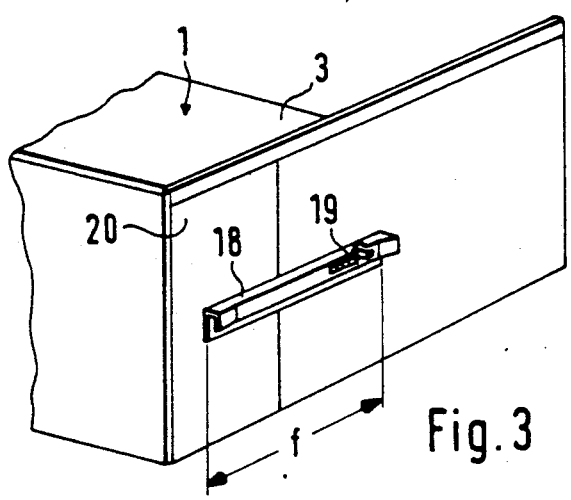

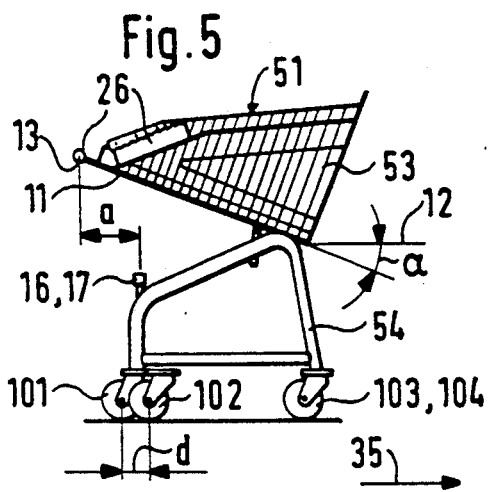
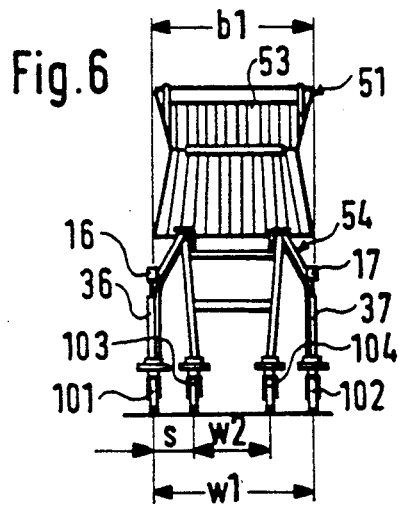
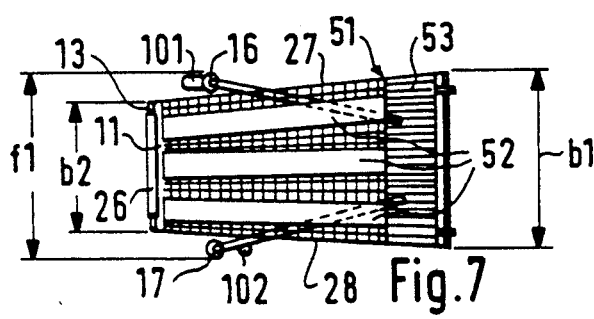
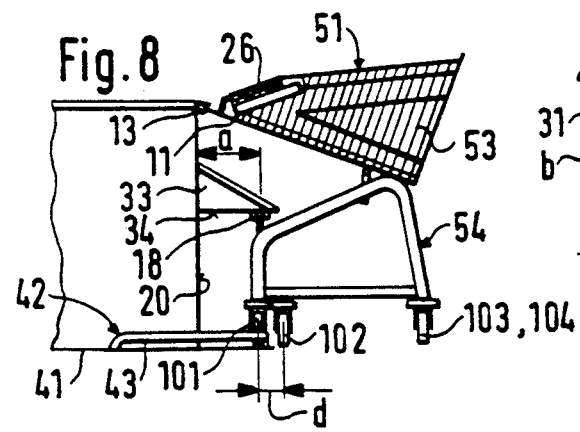
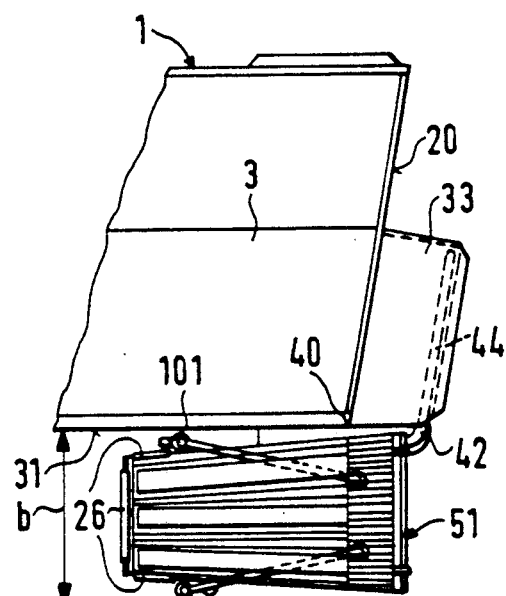
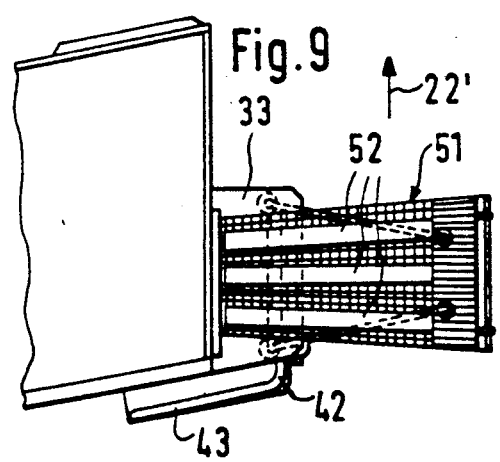
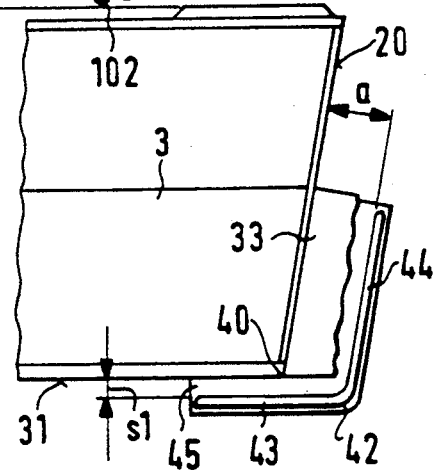

CASHIER CHECK-OUT STATION WITH PACKAGE-CATCHING SHOPPING CART

FIELD OF THE INVENTION

The invention relates to a cashier's check-out station with a package-catching shopping cart, especially for self-service stores, shops, market and the like, comprising a counter having a transport surface including a counter top and/or a conveyor belt leading to a register station, and of a shopping cart having the basic shape of an isosceles trapezoid and whose likewise trapezoidal chassis is provided with a front and rear pair of swivel castors, the front pair of swivel casters having a narrower track width than the rear pair of swivel casters, and the shopping basket being able to travel through a lane leading along the longitudinal side of the counter to the unloading end of the counter where it can be placed at the end of the counter for the reloading of the goods.

BACKGROUND OF THE INVENTION

A check-out system is already known, having a counter with a counter top and with a shopping cart with basket (DE-PS 24 35 780) in which the substantially horizontal bottom of the basket is situated at a short distance above the counter top after a shopping cart has been brought up to the counter to be unloaded. In this arrangement at least one of the four sides of the basket can be swung downwardly on the bottom of the basket and in which the bottom of the basket is removable from the interior of the basket to unload the goods from the basket onto the counter top so that the goods are placed on the counter top when the bottom is withdrawn. The unloaded shopping cart with the bottom reinstalled is parked at the unloading end of the counter top for the reloading of the goods meantime registered, and it can be secured there by a bar magnet against rolling away.

With this cashier system, work is to be made easier for the customer and for the cashier by the fact that all of the merchandise can be moved all at once out of the basket onto the counter, i.e., by a movement of the hand. This is possible, however, only if the basket contains no more merchandise than can fit on the bottom of the basket. If the goods are piled one on top of the other in the basket, there is the danger that, when the bottom is removed from the basket and the cart is pulled away, the goods will tumble over one another or fall from the counter top. Also, the replacement of the bottom into the basket is complicated and troublesome. Additionally the goods rung up must be picked up manually from the counter and placed in the basket at the end of the counter.

Holding the basket or shopping cart with a bar magnet has furthermore proven impractical. For these and other reasons, this check-out system has not been accepted in practice.

A conveyor-belt check-out counter for selfservice shops has been disclosed (DE-GM 76 11 940) in which a merchandise receiving container disposed in back of the payment station at the end of the lane. This container is in the form of a separate carriage, or else can be connected to the counter as a "merchandise cell" so as to be able to swing, turn, shift back and forth or hang. The merchandise container situated at the one side wall of the counter is made movable for the purpose of making this side wall of the counter easily accessible at any time, so that daily adjustment and maintenance work can be performed on the display unit which is integrated into the counter. The merchandise container, even in the form in which it is a movable carriage, is not designed and is not usable as a shopping cart. In its configuration as a merchandise cell, the merchandise container is so connected to the counter that it can only be shifted or rotated to free the one side of the counter. To accommodate the merchandise, however, it is always joined to the counter such that it cannot easily be moved away from this side wall, especially not in the loaded state.

SUMMARY AND OBJECT OF THE INVENTION

It is an object of the invention to create a check-out station with a wheeled package catcher of the kind described above, in which the goods to be registered and paid for are first taken individually, in the conventional manner, out of the shopping basket and placed on the counter or on the conveyor belt of the check-out station and transported by the cashier or by the conveyor belt past the register and, without having to be lifted, the goods can be pushed into a second shopping cart basket which for this purpose is placed at the unloading end of the counter and is mechanically hitched to the counter in the reloading position so as to prevent it from rolling away.

Furthermore, the assurance is to be provided that, before taking away the second shopping cart containing the registered and paid-for merchandise at the unloading side of the counter, the customer will position his emptied shopping cart such that it will be back in the correct position for loading with the merchandise of the next customer. This object is achieved in accordance with the invention by the fact that the shopping cart has, for its use as a package catcher, a chute-like bottom inclined at least 15 degrees from the horizontal and terminating in an upper transverse edge at the level of the counter top, and below this transverse edge it has upright post-like or hook-like tracking means which can be introduced guidingly, in an interlocking manner, into a track disposed on the unloading end wall of the counter and running transversely in a horizontal position, so as to be displaceable in the transverse direction.

The check-out station according to the invention has considerable advantages over the formerly known check-out systems, and they are to be seen above all in the fact that the goods can be pushed individually from the counter top or from the conveyor belt, if the latter extends over the entire length of the counter, into the ready second shopping cart, as they would in the case of a fixed package carrier with a sloping chute-like surface, and after they have been pushed beyond the transverse edge of the chute-like bottom, which is situated at the level of the counter top, they will slide down into the basket by themselves on its chute-like bottom. The assurance is furthermore provided that the second shopping cart, which is to be filled with the registered goods, will be firmly and immovably joined to the counter while the goods are being loaded into it.

To encourage the customer to push the shopping basket in the correct position along the counter, so that the post-like or hook-like tracking means can be brought into engagement with the guiding track at the discharge end of the counter, the configuration of the invention including the basket having a smaller width on the side of the upper transverse edge of the chute-like bottom portion with handles being provided on each side of the upper transverse edge at the same time assures that handles can be provided on the sides of the shopping basket without creating the danger that the customer will get his or her hand pinched against the counter if he or she is grasping the handle facing the counter.

The arrangement of the tracking means on the basket formed by two vertical posts provided with guide wheels or runners and the guiding track formed by a rail of a z-shaped or u-shaped cross section, disposed at the same level as the tracking means on the end face of the counter provides the advantage of very simple and easy-to-use anchoring means between the shopping cart on the one hand and the unloading end of the counter on the other.

Disposing the guiding track on the bottom of a projection fastened to the front end of the counter at a distance from the front end and the offset, provided therein, of the rear pair of swivel casters from the upper transverse edge which simultaneously forms the rear end edge of the shopping basket, results in a certain amount of foot space which at least goes a long way to prevent one's feet from striking the frame or the casters when pushing such a shopping cart.

The length of the track being at least as great as the distance between the two tracking elements from providing the exit end of the track with a spring loaded catch means or with a releasable locking means for the positioning of the basket is advantageous for the secure positioning of the shopping cart in the counter lane.

The disposition of the tracking elements at the narrower end of the basket, on the chassis is provided with a width which corresponds at least approximately to the greatest width of the shopping basket on the opposite end thereby assuring that the baskets, which as a rule are trapezoidal, i.e., unequally wide at the front and back, will be situated parallel to one another and the side handles will be unable to clash if a loaded shopping cart is pushed out of the guide track while an empty cart is being pushed into it.

The swivel castor arrangement being offset in the pushing direction that, in transverse movement, the left swivel castor of the shopping basket cannot come in contact with the right swivel castor of the shopping basket standing directly in line beside it assures that a shopping cart filled with goods at the unloading end face of the counter can be pushed out of the guide track along the said end face while another, empty shopping cart is pushed into the guide track to take its place.

The lane running along the check-out counter is limited in its width either in a second check-out counter or by a railing of a dimension which is slightly greater than the maximum shopping cart width the lane may be longer by more than one shopping cart length than the check-out counter and may have, at its end, a crosspiece preventing the shopping cart from being pushed through. These features are intended to constrain the customer to bring his or her unloaded shopping cart to the unloading end of the counter and into the position in which it is guided by its tracking means in the track, and position it correctly for loading with the next customer's goods.

An additional improvement in regard to the correct positioning of the unloaded shopping cart at the end of the counter is achieved by the provision of an angular rail leading around the corner and having two branches, disposed at the corner, formed by the side of the lane and the unloading end of the check-out counter, the swivel castor of the rear pair of swivel castors having the greater track width, offset rearwardly from the other swivel castor of the pair of swivel castors at least by the thickness of the guide rail branch running along the front and the swivel castor of the front pair of swivel castors which is one the counter side is offset inwardly from the rearwardly offset swivel castor of the rear pair of swivel castors by an amount that is greater than the lateral distance of the one guide rail branch on the longitudinal side of the counter, causing the one swivel caster of the shopping cart to be positively guided such that, when this swivel caster is gripped by the guide track, it will be turned positively into the correct position at the end face of the counter. This will assure that only the one swivel caster of the rear pair of swivel casters can be caught by the guide track, while all other swivel casters can roll around it, both at the longitudinal side of the counter and at the end face of the counter. To enable this guidance to operate completely trouble-free at least the rearwardly offset swivel castor of the rear pair of swivel castors is disposed laterally outside of the shopping cart area, and the counter-side swivel castor of the front pair of swivel castors is offset inwardly from the outermost lateral shopping cart boundary by an amount which is greater than the lateral distance of the guardrail branch on the longitudinal side of the counter.

A further object of the invention is to provide a check-out station and a system for checking out goods which is simple in design, and practical in use and economical to operate.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

The invention will now be further explained with the aid of the drawing wherein:

FIG. 1 is an elevation view of one side of the check-out counter;

FIG. 2 is a top view of the check-out counter;

FIG. 3 is a perspective view of the unloading end of the check-out counter;

FIG. 4 is a perspective shopping cart which can be used as a package catcher;

FIG. 5 is a side view of another shopping cart;

FIG. 6 is a front view of the shopping cart of FIG. 5;

FIG. 7 is a top view of the shopping cart of FIG. 5;

FIG. 8 is a side view of the unloading end section of another counter, with a shopping cart parked at the end of the counter;

FIG. 9 is a top view of FIG. 8;

FIG. 10 is a top view of two check-out counters disposed sideby side with a shopping cart standing between them.

DESCRIPTION OF THE PREFERRED EMBODIMENTS

Referring to the drawings in particular, the invention embodied therein includes a counter 1 having at least one of a carrier platform 3 and a conveyor belt 4, one or both leading to a register station 6. The counter 1 defines a lane 22 either formed between successive counters or between a counter 1 and a railing 23. A shopping cart 5 includes a shopping basket 50 having a substantially isosceles trapezoidal shape viewed from above. The shopping cart includes a chassis frame 9. A front pair of castors 101, 102 is attached to the chassis frame 9 defining a front castor track width (between castor 101 and castor 102). A rear pair of castors 103, 104 is attached to the chassis frame 9 to define a rear castor track width (between castors 103 and 104). The front castor track width is smaller than the rear castor track width. The shopping basket is constructed to travel through the lane defined along the longitudinal side of the counter, to an unloading end of the counter. The shopping basket includes a chute-like bottom portion having an upper transverse edge 13. Tracking means 16, 17 are provided positioned adjacent the upper transverse edge 13. A track 18 is disposed transversely in a substantially horizontal position on the unloading end of the counter. The tracking means engages the track for positioning the upper transverse edge of the basket adjacent the unloading end of the counter.

The check-out counter consists of a counter 1 which is provided with an elongated top and with a conveyor belt 2. This conveyor belt 2 terminates at a fixed platform 3 situated at the same level, on which a cash register 4 is set up, and across which the merchandise carried by the conveyor belt 2 is pushed into a wheeled shopping basket 5 parked at the unloading end. At the rear of the cash register, in the direction of conveyor belt movement, a second conveyor belt can be disposed which advances the goods into the shopping basket. The conveyor belt 2, and the second conveyor belt if used, as well as the table 3, together form the path of the counter top, on which the purchased goods are transported or pass.

On the side of the counter 1 opposite the cash register 4 is the cashier's station 6 which is provided with a keyboard 7. On the table there is also an electronic reader 8 which is capable of reading data from the passing goods and entering them into the cash register 4.

The shopping cart 5 has a basket 50 consisting of sections of wire mesh, which is of triangular shape as seen from the side and in a top view it has the shape of an isosceles trapezoid. The shopping cart 5 is provided with a chassis which is equipped with a front pair 103/104 of swivel casters and a rear pair 101/102 of swivel casters. The front pair of swivel casters 103/104 has a narrower track than the rear pair 101/102. The basket part 50 is provided with a chute-like bottom 11 which is inclined from the horizontal 12 over its entire length at an angle $\alpha$ of about 20 degrees and terminates at a narrow-end transverse edge 13 which is situated at the level of the table 3. Beneath this transverse edge 13, vertical, post-like tracking means 16 and 17 are disposed either directly on the chute-like bottom 11 or on the two frame members 14 and 15 of the chassis 9; these can be provided with wheels or runners and which can be introduced together into a track 18 which is formed by a guide rail of Z-shaped or U-shaped cross section disposed in a horizontal position on the unloading end 20 of the counter 1. In FIG. 1, two such guide rails 18 are disposed one above the other. In practice, however, only one of these two rails is provided, depending on whether the tracking means 16 and 17 are disposed above or below on the shopping cart 5. The length 1 of this guide track 18 is slightly greater than the distance fl between the two tracking means 16 and 17, so that both tracking means 16 and 17 can be introduced simultaneously into the guide track 18 in order to secure the shopping cart 5 against rolling away and hold it in the position represented in FIGS. 1 and 2 in which the goods carried across the counter top 1 are pushed back into a shopping cart 5 and can automatically slide down on the chute-like bottom against a padded strip 32. The padded strip 32 serves for the gentle braking or stopping of the downwardly sliding goods. It is disposed on the upwardly hinged end wall of the shopping cart.

So as to easily position the shopping cart 5 at the unloading end face 20 of the counter 1, a resilient catch means 19 is provided at the exit end of the guide rail forming the guide track 18. Instead of this, a locking means which can be actuated by the cashier could be provided by which the loaded shopping cart 5 will be released only after the customer has paid.

As best seen in FIG. 2, the basket 50 is substantially narrower at the end at which the transverse edge 13 is located than at the opposite end, where the customary handle 21 is provided in the form of a cross bar for pushing the shopping cart 5, as in the case of conventional shopping carts. However, the chassis 9 is wider at the transverse-edge 15 end than at the opposite end where the handle 21 is located. This assures that two shopping carts situated side by side and in contact with one another will be at least approximately parallel to one another, so that it will easily be possible to use another empty cart 5' to push a cart that is engaged with the guide track and situated in the loading position at the end 20 of the counter 1 into the position 5" by thrusting the empty cart 5' with its tracking means 16 and 17 in the direction of arrow 22' into the guide track 18.

At the same time, however, it is necessary to push shopping cart 5 in the direction of arrow 25 past the counter 1 so that the tracking means 16 and 17 and the transverse edge 13 of the chute-like bottom 11 will be at the rear in the direction of travel.

To enable the customer to hold the unloaded shopping cart 5 comfortably and steer it easily as he or she pushes it past the cashier's counter 1 with the handle 21 foremost, additional handles 26 are provided on the transverse-edge 13 end of both side sections 27 and 28 of the basket 50.

At the same time, the fact that the chassis 9 is wider at the narrow basket end assures that the hands of the customer grasping the shopping cart by the handles 26 will be protected against being pinched laterally.

To prevent the two swivel casters 101 and 102 at the wider end of chassis 9 on two closely adjacent shopping carts 5 and 5' or 5" from interfering with one another, the two swivel casters 101 and 102, as best seen in FIGS. 2 and 4, are offset from one another in the pushing direction to such an extent that they cannot contact one another when the tracking means 16 and 17 of the one cart 5 are aligned with those of the other shopping cart 5' or 5".

When the customer arrives with a loaded shopping cart 5 at the check-out counter 1, he or she takes the goods out of the basket and places them first on the conveyor belt 2. The goods are then transported by the conveyor belt 2 to the reading system 8 and platform 3, taken from the conveyor belt by the cashier seated at the station 6, pushed across the reading system 8 and across the platform 3 into the empty shopping cart standing at the end 20, where they slide down over the chute-like bottom 11. The shopping cart 5 thus serves the function of package catcher, but the customer does not have to take the goods back out of the shopping cart 5 at this point, but can push the cart with all the goods away from its hitch to the counter to a place where she or he can transfer the goods to his or her own containers. This pushing of the loaded shopping cart 5 away from its hitch to the guide track 18 on the counter 1 is performed by the customer by bringing his or her emptied shopping cart 5 into position 5' and then pushing this empty cart away from position 5' in the direction of arrow 22', i.e., in the transverse direction, such that the tracking means 16 and 17 come into engagement with the guide track 18 and thus the loaded shopping cart 5 is simultaneously pushed out of the guide track 18 into position 5". When this has been done, the customer can then remove the loaded shopping cart 5 away from position 5" and move it to the above-mentioned other transfer point where he or she will not interfere with the continued operation of the check-out counter 1. The empty shopping cart 5, which the customer previously used for collecting the merchandise, is left standing in the loading position at the end 20 of the check-out counter.

To assure that the customer really will push his or her unloaded shopping cart 5 to the location of the cart 5 filled with his or her purchases, the lane 22 along the check-out counter 1 in FIG. 2 is provided with a railing 23 which is longer by the length l of a shopping cart than the check-out counter 1 and has at its end a crosspiece 24. This crosspiece 24 prevents the empty shopping cart from being pushed through in the direction of the arrow 25. The railing 23 with the crosspiece 24 also assures that the customer will not be able to reach the shopping cart 5 filled with the goods unless he or she brings his or her empty shopping cart 5 to the position in which it can be loaded with the purchases of the next customer in the above-described manner.

As it can be seen in FIG. 2, the unloading end 20 of the check-out counter 1 is not at right angles to its long side 31 but at an angle α of about 100 to 115 degrees thereto. This facilitates the introduction of the shopping carts 5 in this area.

In order to span any gap 29 that might develop between the transverse edge 13 of the chute-like bottom 11 of the shopping cart 5 and the platform 3, a thin, outwardly projecting plate 30 (FIG. 1) is provided at the front end of the platform 3, and can extend over the entire width of the basket 50. To enable the transverse edge 13 of the chute-like bottom 11 of the shopping cart 5 to be pushed unhampered under this plate 30, the two side sections 27 and 28 of the shopping cart 5 are set back several centimeters from the transverse edge 13, as best seen in FIG. 4.

To enjoy the benefits of the invention in the transfer of the goods from one shopping cart 5 across the counter to the other shopping cart at the unloading end 20 of the counter 1, it is not necessary for the chassis 9 to have the shape represented in the drawing. Instead, the shape of the chassis can be designed with other considerations in mind, such as stability and the ability to telescope the carts compactly together.

In FIGS. 5 to 10 there is shown another shopping cart 51 which likewise consists of a basket 53 which is substantially wedge-shaped in elevation and of an isosceles trapezoidal shape in plan, and of a chassis 54. The chassis 54 has two pairs of swivel casters 101/102 and 103/104 with different track widths w1, w2. In contrast to basket 50 of shopping cart 5, the basket 53 of cart 51 has no handle at its wider end. Handles 26 are provided at the narrow end only on the two side sections 27 and 28 and at the transverse edge 13 of the chute-like bottom 11. This calls for the customer to push the cart 53 to and alongside the check-out 1 in the correct direction of the arrow 35. The rest of the configuration of the basket 53 corresponds at least approximately to that of basket 50 in the embodiment represented in FIGS. to 4. The chute-like bottom of basket 53 is additionally provided with three sheet metal slide strips 52 running lengthwise.

Another difference from shopping cart 5 consists, in the case of shopping cart 51, in the fact that the chassis 54 is made shorter in length than the basket 53, and that the rear pair of swivel casters 101/102 is set forward by the distance a, which can amount to about 15 to 30 cm, from the upper transverse edge 13 of the basket 53. This enables the shopping cart 51 to be pushed more easily, because the danger that one's feet might collide with the chassis 54 or the swivel casters 101, 102, is substantially reduced.

As it can be seen especially in FIG. 5, the postlike tracking means 16 and 17, which are fastened upright on sections 36 and 37 of the chassis 54, are also yet forward from the upper transverse edge 13 of the chute-like bottom 11 by the distance a.

As FIG. 8 shows, the guide track 18, consisting of a rail of channel-shaped cross section, is accordingly disposed at a distance a from the end 20 of the check-out counter 1 on the bottom 34 of a projection 33, so that shopping cart 51 can also be anchored and secured against rolling away from the end of counter 1 by its two tracking means 16 and 17 and the guide track 18 such that the upper transverse edge 13 of the chute-like bottom 11 will be placed against the upper edge of the counter top, as shown in FIGS. 8 and 9.

Another difference from the embodiment represented in FIGS. 1 to 4 is that at the corner 40 formed by the side 31 of the lane and the unloading end 20 of the check-out counter there is provided an angled guide rail 42 having two branches 43 and 44 leading around this corner. Branch 43 runs parallel to the counter side 31 and branch 44 runs parallel to the end face 20. The purpose of this guide rail is to catch the one swivel caster 101 of the rear pair 101/102 and guide it around the corner 40. To permit this to be done easily, the swivel caster 101 of the rear pair 101/102 of swivel casters having the greater track width w1, which is on the check-out counter side as it passes through the lane 22, is offset rearwardly by the amount d from the other swivel caster 102 of this pair (see FIG. 5). Furthermore, the swivel caster 103 on the check-out counter side of the front pair of swivel casters 103/104 is offset inwardly from the counterside swivel caster 101 of the rear pair of swivel casters 101/102 by an amount a which is greater than the lateral distance s1 between guiding branch 43 and the long side 31 of the counter. The other guiding branch 44 running parallel to the end face 20 is at the distance a from the latter, which is the distance to which the swivel caster 101 is offset forwardly with respect to the upper transverse edge 13 of the chute-like bottom 11.

Due to this arrangement of the guiding branches 43 and 44 of the guide rail 41 and of the swivel casters 101, 102 and 103, the shopping cart 51 can be positively pushed around the corner 40 in an easy manner, such that the tracking means 16 and 17 of the chassis 54 come positively into engagement with the guide track 18. As it can be seen in FIGS. 7, 9 and 10, in this embodiment of the shopping cart 51, the rearwardly offset swivel caster 101 is again disposed outside of the area covered by the basket 53, so that, in the case of a straight longitudinal wall of the check-out counter, the left hand of the customer guiding the shopping cart by the side handle 26 will not be able to collide with the counter because the swivel caster 101 situated below it provides for the necessary clearance away from the side 31 of the counter 31.

While in FIG. 2 the lane 22 is defined on the one side by the check-out counter 1 and on the other side by the railing 23, the lane 22 in the embodiment represented in FIG. 10 is defined by two adjacent check-out counters 1 which are at a distance apart from on another that is slightly greater than the greatest width b1 of the shopping cart 51.

It is also to be mentioned that the guide rail 42 in the illustrated example is fastened on a likewise angled bottom plate 45 which in turn can be fastened to the counter. The handling and the transfer of the goods and the subsequent parking of the shopping cart 51 at the end of the counter 1 is performed in the manner described in connection with FIGS. 1 to 4, with the advantage, however, that in this case, positive guidance is given to the shopping cart 51 both at the corner 40 and in the area of the guide track 18.

While specific embodiments of the invention have been shown and described in detail to illustrate the application of the principals of the invention, it will be understood that the invention may be embodied otherwise without departing from such principals.

WHAT IS CLAIMED IS:

1. A cashier check-out station, comprising:
   a counter having at least one of a carrier platform and a conveyor belt, leading to a register station, said counter defining a lane along a longitudinal side of said counter;
   a shopping cart with a basket having a substantially isosceles trapezoidal shape viewed from above, said cart including a chassis frame, a front pair of castors attached to said chassis frame defining a front castor track width, a rear pair of castors attached to said chassis frame defining a rear castor track width, said front castor track width being smaller than said rear castor track width, said shopping basket being able to travel through said lane defined along the longitudinal side of said counter to an unloading end of said counter, said shopping basket having a chute-like bottom portion inclined at an angle α of at least 15 degrees, from the horizontal, said bottom portion having an upper transverse edge;
   tracking means, positioned adjacent said upper transverse edge; and,
   a track disposed transversely in a substantially longitudinal position on the unloading end of the counter, said tracking means for engaging said track for positioning said upper transverse edge adjacent said unloading end of said counter.

2. A check-out station according to claim 1, wherein said basket has a smaller width at the side of the upper transverse edge of the chute-like bottom portion, said side of the upper transverse edge having a handle.

3. A check-out station according to claim 1, wherein the tracking means includes two vertical posts provided with one of guiding wheels and runners, said track being formed by a rail of z-shaped cross section, said rail being disposed at the level of the tracking means on an end face of the counter.

4. A check-out station according to claim 1, wherein said track is disposed on a bottom portion of a projection fastened to the unloading end of the counter, said track being spaced a distance of between 15 centimeters and 30 centimeters from the unloading end, said tracking elements and said rear pair of castors being offset in a forward direction by said distance, with respect to the upper transverse edge of the chute-like bottom.

5. A check-out station according to claim 1, wherein said track has a length which is at least as great as the distance between first and second tracking elements of said tracking means.

6. A check-out station according to claim 5, wherein said track is provided at the unloading end with one of spring-loaded catch means and releasable locking means for positioning the basket.

7. A check-out station according to claim 1 wherein said basket includes a narrower end supporting the tracking element, the chassis of the shopping cart having a greatest width which corresponds at least approximately to the greatest width of the shopping basket, at an end opposite to said chassis greatest width.

8. A check-out station according to claim 1, wherein the rear pair of swivel castors are offset from one another in a pushing direction such that, in transverse movement, a left swivel castor of said rear pair of castors cannot come in contact with a right swivel castor of said rear pair of castors standing directly in line beside it.

9. A check-out station according to claim 1, wherein the lane, running along the check-out counter is limited in its width, by a railing, the width having a dimension b which is slightly greater than a maximum shopping cart width.

10. A check-out station according to claim 9, wherein said railing is longer by more than one shopping cart length than the check-out counter, said railing having a crosspiece preventing a shopping cart from being pushed beyond said lane.

11. A check-out station according to claim 8, wherein an angular guiderail is disposed leading around a corner of said counter, said guiderail having two branches disposed at the corner, formed by the side of the lane and the unloading end of the check-out counter, a swivel castor of the rear pair of swivel castors having a greater track width, on the counter side of the lane, being offset rearwardly from the other swivel castor of the rear pair of swivel castors at least by the thickness of guiderail branch, a swivel castor of the front pair of swivel castor, on the counter side, being offset inwardly from the rearwardly offset swivel castor of the rear pair of swivel castors by an amount a that is greater than the lateral distance of the one guiderail branch running along the lane of the counter.

12. A check-out station according to claim 11, wherein at least the rearwardly offset swivel castor of the rear pair of swivel castors is disposed laterally outside of the shopping cart area, the counter-side swivel castor of the front pair of swivel castors being offset inwardly from an outermost lateral shopping cart boundary by at least the dimension a.

13. A check-out station according to claim 1, wherein the unloading end of the counter is formed at an angle of about 100 to 115 degrees with respect to a longitudinal side of the counter.

14. A check-out station according to claim 1, wherein the counter top is provided at its unloading end with an outwardly projecting plate and two sides of the shopping basket are provided terminating offset from the transverse edge of an amount of the projection of the projecting plate.

15. A check-out station according to claim 1, wherein a padded strip of soft material is disposed at the lower end of the chute-like bottom on an inside of the basket opposite the transverse edge.

16. A check-out station according to claim 1, wherein the chute-like bottom of the shopping basket is provided with at least one sheet-metal slide strip.

17. A cashier check-out station according to claim 1, wherein said tracking means includes stud members positioned underneath said upper transverse edge.

18. A check-out station according to claim 1, wherein the tracking means includes two vertical posts provided with one of guiding wheels and runners, set track being formed by a rail of u-shaped cross section, said rail being disposed at the level of the tracking means on an end phase of the counter.

19. A check-out station according to claim 1, wherein the lane, running along the check-out counter is limited in its width, by a second check-out counter, the width having a dimension b which is slightly greater than a maximum shopping cart width.

20. A cashier check-out station according to claim 1, wherein said tracking means includes hook members positioned underneath said upper transverse edge.

* * * * *